(12) United States Patent
Chen

(10) Patent No.: US 6,771,493 B2
(45) Date of Patent: Aug. 3, 2004

(54) NOTEBOOK COMPUTER WITH SLIDING KEYBOARD

(75) Inventor: Jung Hung Chen, Keelung (TW)

(73) Assignee: MITAC Technology Corp., Hsinchu (TW)

( * ) Notice: Subject to any disclaimer, the term of this patent is extended or adjusted under 35 U.S.C. 154(b) by 51 days.

(21) Appl. No.: 10/199,414

(22) Filed: Jul. 18, 2002

(65) Prior Publication Data

US 2004/0012918 A1 Jan. 22, 2004

(51) Int. Cl.[7] .................................................. G06F 1/16
(52) U.S. Cl. ........................ 361/680; 361/683; 292/95
(58) Field of Search ............................. 361/680, 681, 361/683; 341/22; 345/168, 173; 235/145 R; 400/489, 682, 691–693; 292/95

(56) References Cited

U.S. PATENT DOCUMENTS 5,539,615 A * 7/1996 Sellers ........................ 361/680
5,818,360 A * 10/1998 Chu et al. ..................... 341/22
6,028,768 A * 2/2000 Cipolla ....................... 361/687
6,144,554 A * 11/2000 Mok .......................... 361/687
6,341,061 B1 * 1/2002 Eisbach et al. .............. 361/687

* cited by examiner

*Primary Examiner*—Gerald Tolin
*Assistant Examiner*—Anthony Q. Edwards
(74) *Attorney, Agent, or Firm*—Merchant & Gould, P.C.

(57) ABSTRACT

A notebook computer with a sliding keyboard has the keyboard portion forming an independent keyboard module that mounts on slide rails located on two sides of the body. The keyboard module is laid flat on the body in normal conditions. When in use, the keyboard module may be slid to the edge of the body. The thickness of the body forms an elevation from the desktop surface to allow the keyboard module be raised to an angle to conform to ergonomics to facilitate user operations and to alleviate fatigue in the user's hands.

7 Claims, 9 Drawing Sheets

NOTEBOOK COMPUTER WITH SLIDING KEYBOARD

FIELD OF THE INVENTION

The invention relates to a notebook computer and particularly to a notebook computer that has a modularized keyboard that may be moved and slid to the edge of the body to form an angle to facilitate user operations.

BACKGROUND OF THE INVENTION

With thriving developments of computers these days, portable computers have become essential working and business tools for many people. Computer manufacturers have constantly reduced the size of portable computers. Now many portable computers are reduced to the size of notebooks and are almost as powerful as desktop computers. These notebook computers can be carried in attache cases or handbags to meet the requirements of business people anytime anywhere.

The biggest difference between notebook computers and desktop computers is their display devices. The display device on a notebook computer has to be small, light, thin and consume less electrical power. Its manufacturing technology is much more complex than conventional display devices which use cathode ray tubes. In order to reduce costs, notebook computers generally are equipped with passive matrix type color display devices or active matrix type color display devices. The power supply for notebook computers is generally NiMH or NiCd batteries. High-end models could be coupled with Li-ion batteries which have longer service time and no memory loss effect. Some types of batteries can last three to four hours. A few types can even last up to ten hours. For business people who have to travel frequently, notebook computers offer great value as they can work when traveling.

In order to make notebook computers more convenient, most notebook computers have keyboards directly installed on the notebook computer main body. The keyboards thus constructed cannot be adjusted to a desired using angle. As a result, they do not conform to ergonomics for user operations, and tend to make user's hands become fatigued easily.

SUMMARY OF THE INVENTION

In view of aforesaid disadvantages, the primary object of the invention is to provide a notebook computer with a keyboard that may be adjusted to a desired angle to conform to ergonomics and alleviate fatigue from users' hands during operations.

The notebook computer with a sliding keyboard according to the invention includes a screen panel, a body and a keyboard module. The screen panel is pivotally engaged with one side of the body. The body has a housing chamber and at least one slide rail located on one side of the body extending from the pivotal side to an opposite side thereof. The keyboard module is mounted on the slide rail in a straddle manner. In normal conditions, the keyboard module is flatly held in the housing chamber. When in use, the keyboard module may be slid along the slide rail to the edge of the body side opposite to the pivotal side so that the keyboard module may rest on the edge of the body to form an angle to facilitate user operations. Such a construction conforms to ergonomics and allows users to operate the keyboards without making a user's hands uncomfortable.

In addition, the edge of the body corresponding to the slid and rested location of the keyboard module may have a plurality of anchor positions to allow the keyboard module to form many different angles for user selection.

The foregoing, as well as additional objects, features and advantages of the invention will be more readily apparent from the following detailed description, which proceeds with reference to the accompanying drawings. The drawings are only to serve for reference and illustrative purposes, and are not intended to limit the scope of the invention.

BRIEF DESCRIPTION OF THE DRAWINGS

FIG. 1 is a schematic view of the invention.

FIGS. 2A through 2E are schematic views of the invention during movement.

FIG. 3 is a schematic view of a first embodiment of the tenon of the invention.

FIG. 4 is a schematic view of a second embodiment of the tenon of the invention.

FIG. 5 is a schematic view of the invention with adjustable angles.

DESCRIPTION OF THE PREFERRED EMBODIMENTS

Please referring to FIG. 1, the notebook computer with a sliding keyboard according to the invention includes a body 1, a screen panel 2, and a keyboard module 3. The screen panel 2 is pivotally engaged with one side of the body 1. The body 1 has a housing chamber 11 for holding the keyboard module 3 (as shown in FIG. 2D). The keyboard module 3 and the body 1 are electrically connected through a conductive line or elastic strips. The conductive line may be located in the housing chamber 11 and has extensibility to allow the keyboard module 3 to slide and still maintaining electric connection. When elastic strips are adopted, they may be located on two sides of the keyboard module 3, such that the entire slide rails 12 may become elastic contact strips or only the front section and rear section of the slide rails 12 become elastic contacts (not shown in the drawings). The slide rails 12 are located on two sides of the body 1 and are extended from the pivotal side where the screen panel 2 is engaged to another side opposite the pivotal side. The keyboard module 3 has two sides extending downwards to form two hooks 31 for engaging with the slide rails 12 and sliding thereon. In normal conditions, the keyboard module 3 is laid flat in the housing chamber 11 and is anchored therein through a first tenon **14*a* located on each slide rail 12 (shown in FIG. 3**).

Referring to FIG. 3 for the engaging relationship between the first tenon **14*a* and the hook 31 of the keyboard module 3, the first tenon 14*a* may be engaged with a cavity 311 formed on an inner side of the hook 31. There is a spring 17 located on a rear side of the first tenon 14*a* to keep the first tenon 14*a* and the hook 31 in a latched condition. The first tenon 14*a* has an exposed trigger section 13*a* for moving the first tenon 14*a* rearwards to depress the spring 17 and release the keyboard module 3 so that the hook 31 may be slid on the slide rail 12 and the keyboard module 3** may be moved.

Referring to FIG. 2A, when in use, push the trigger section **13*a* to unlatch the hook 31 and make the hook 31 slidable on the slide rail 12. Then the entire keyboard module 3 may be lifted, as shown in FIG. 2B, until reaching the extension end of the slide rail 12. Then move and slide the keyboard module 3 outwards (as shown in FIG. 2C) until reaching the other end of the slide rail 12 to allow the hook 31 to latch on a second tenon 14*b*, as shown in FIG. 2D**.

Figure 1:
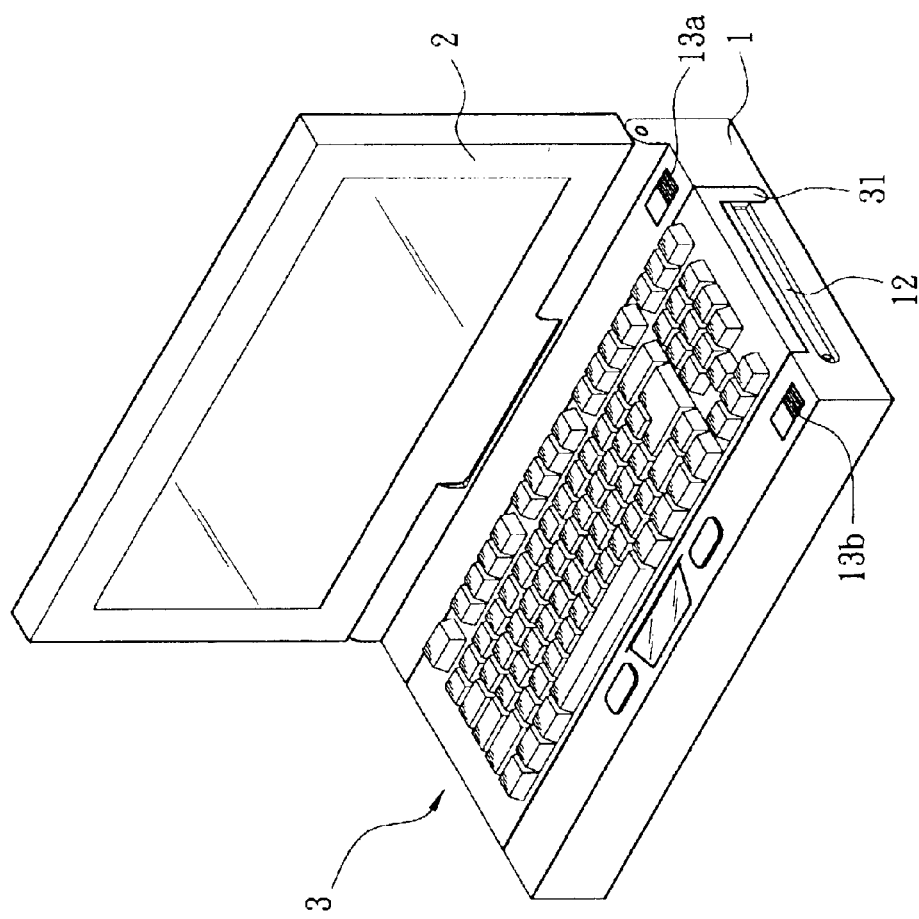
Figure 2A:
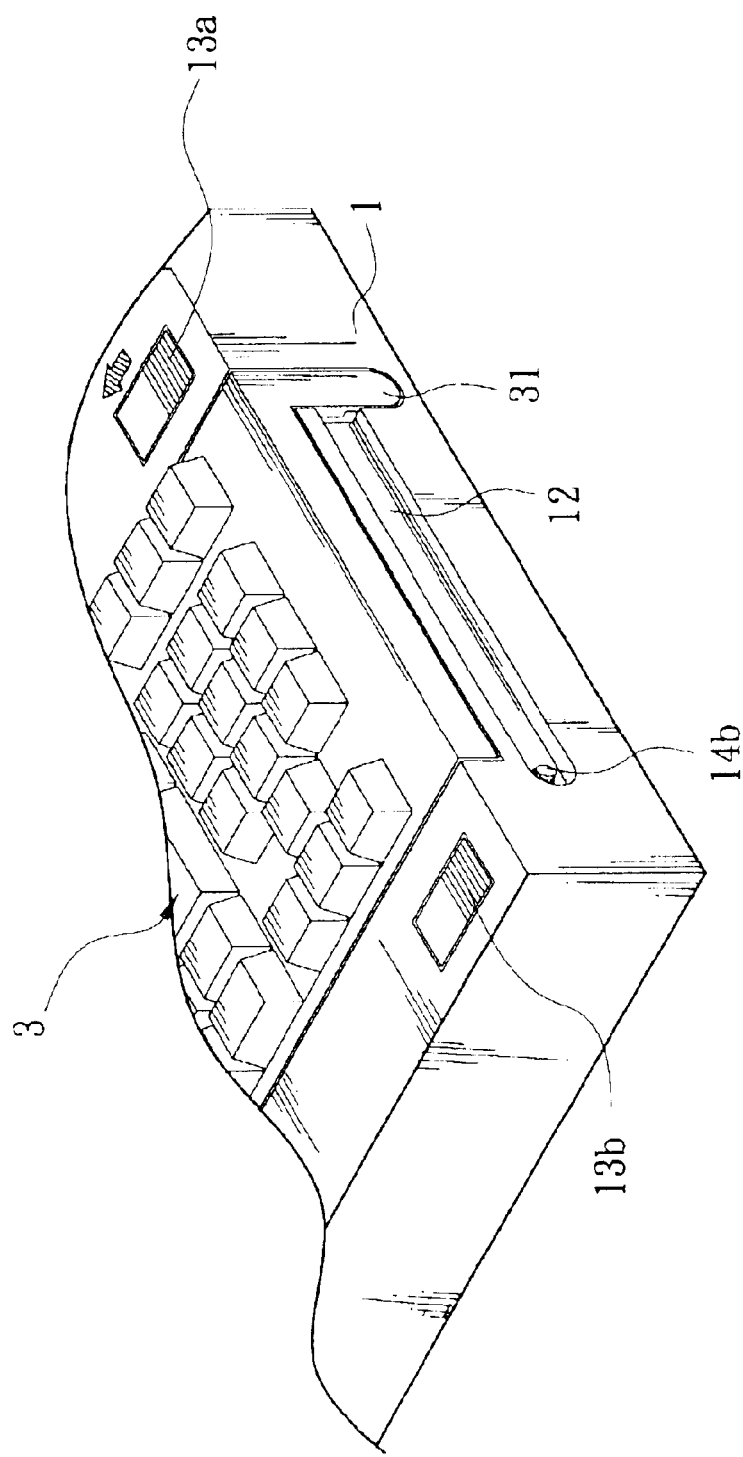
Figure 2B:
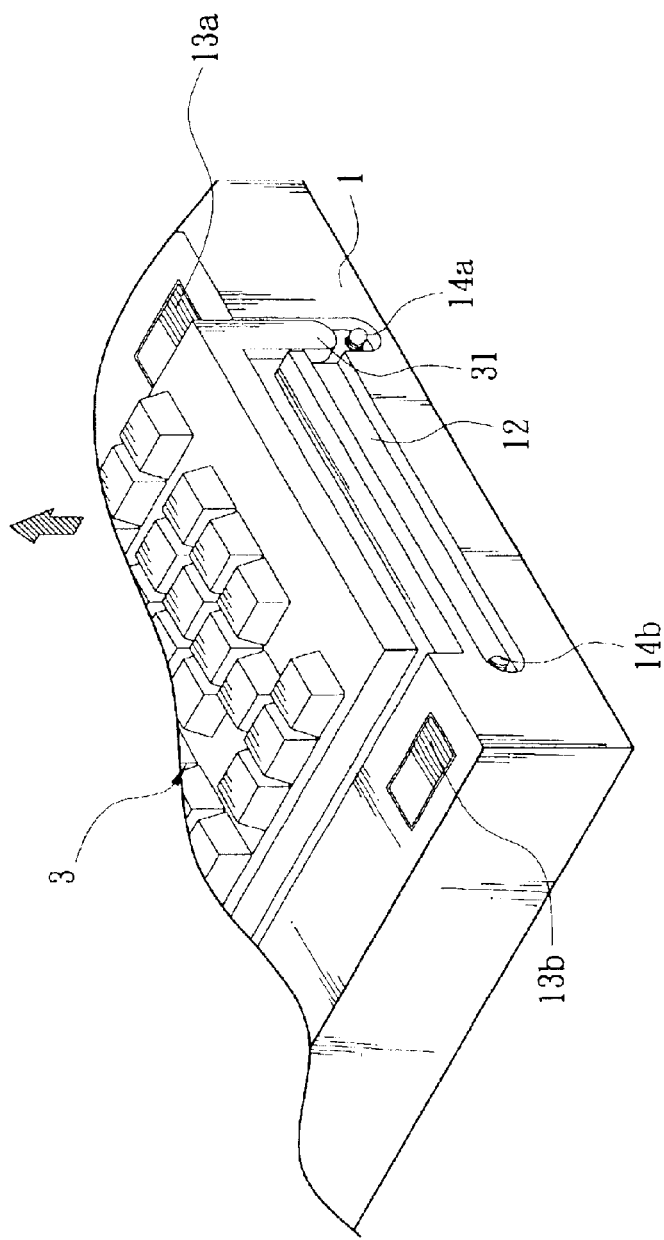
Figure 2C:
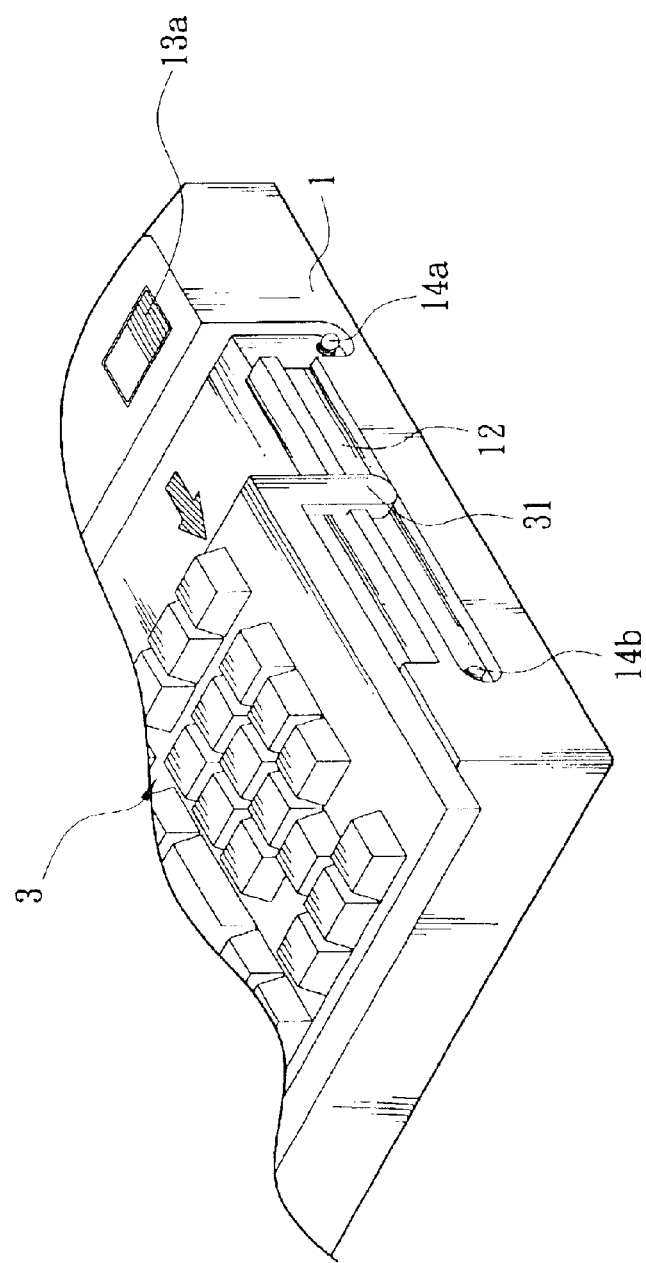
Figure 2D:
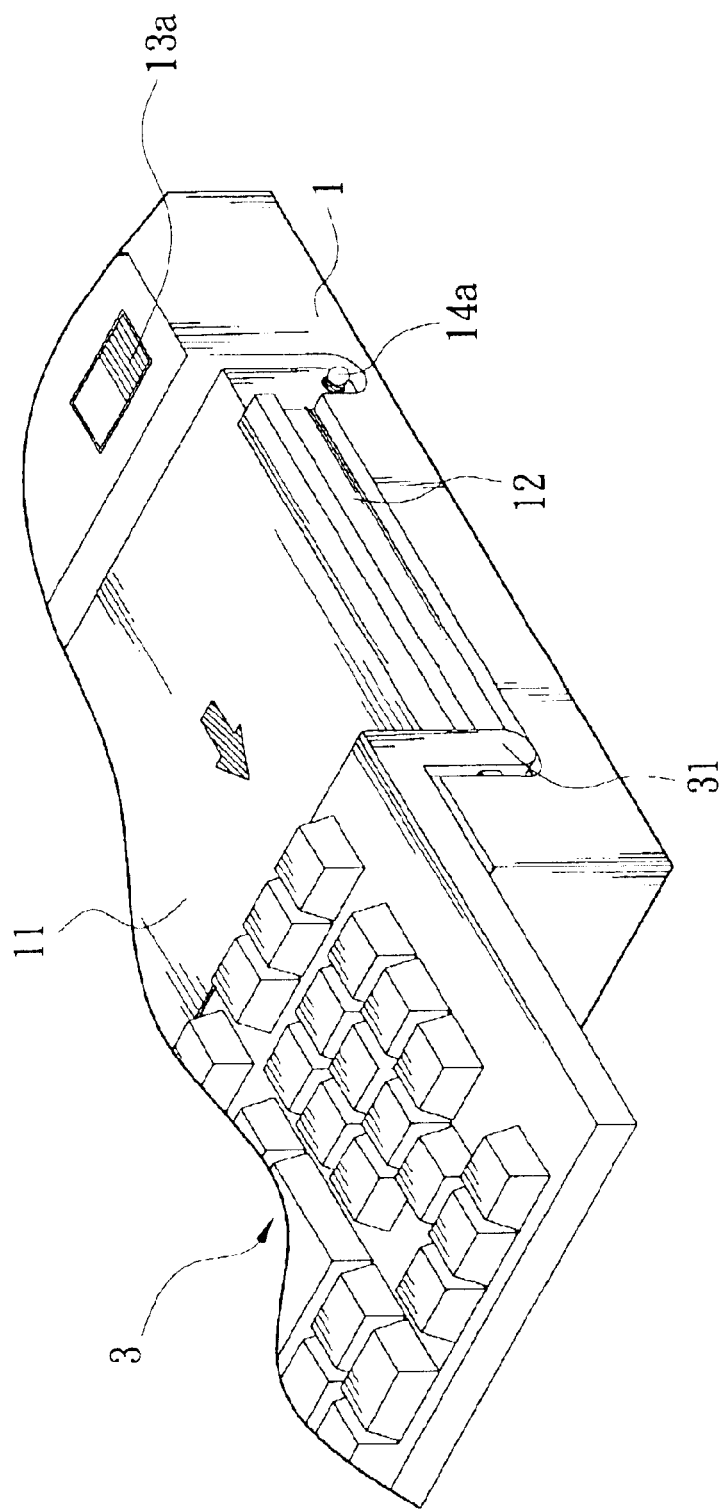
Figure 2E:
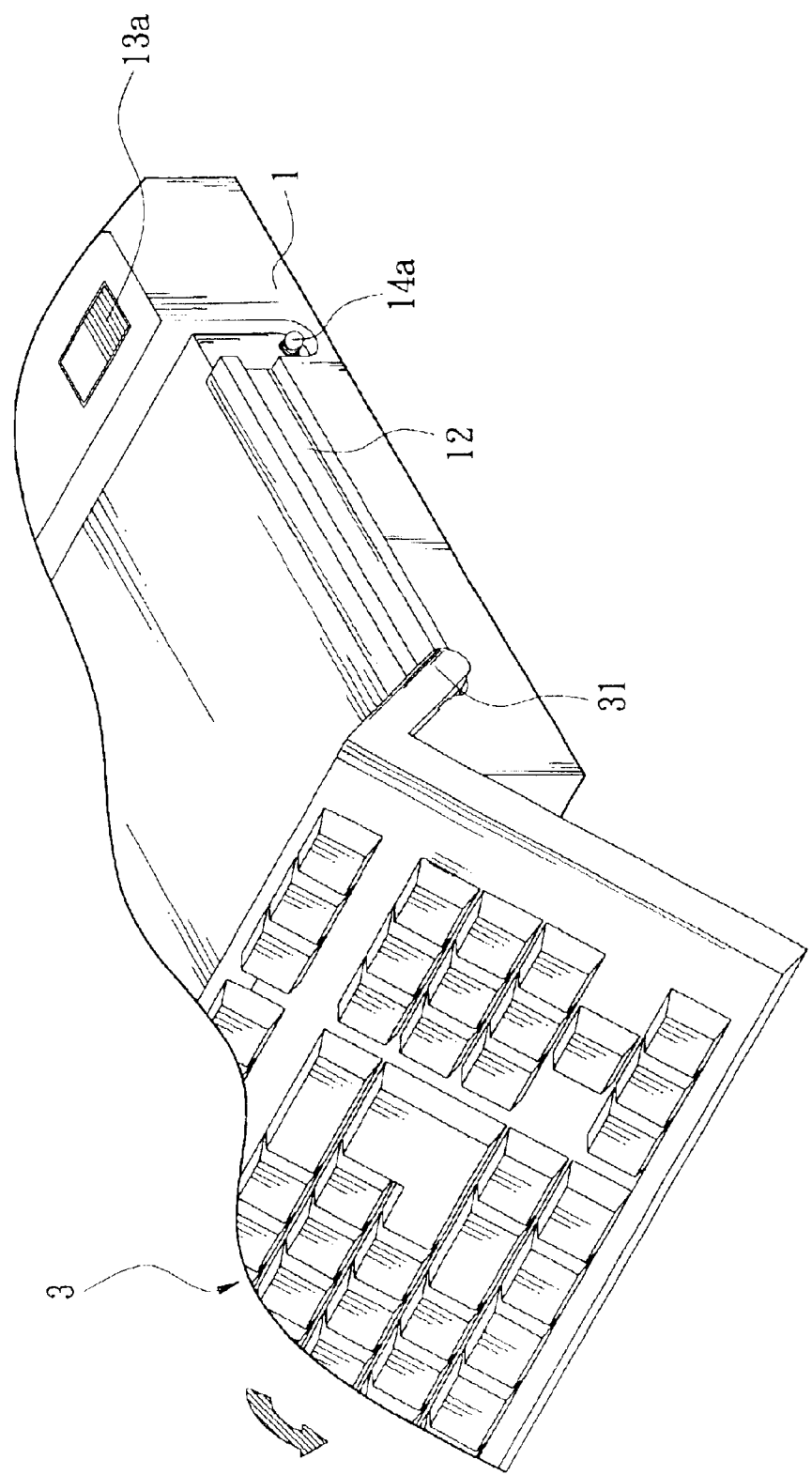
Figure 3:
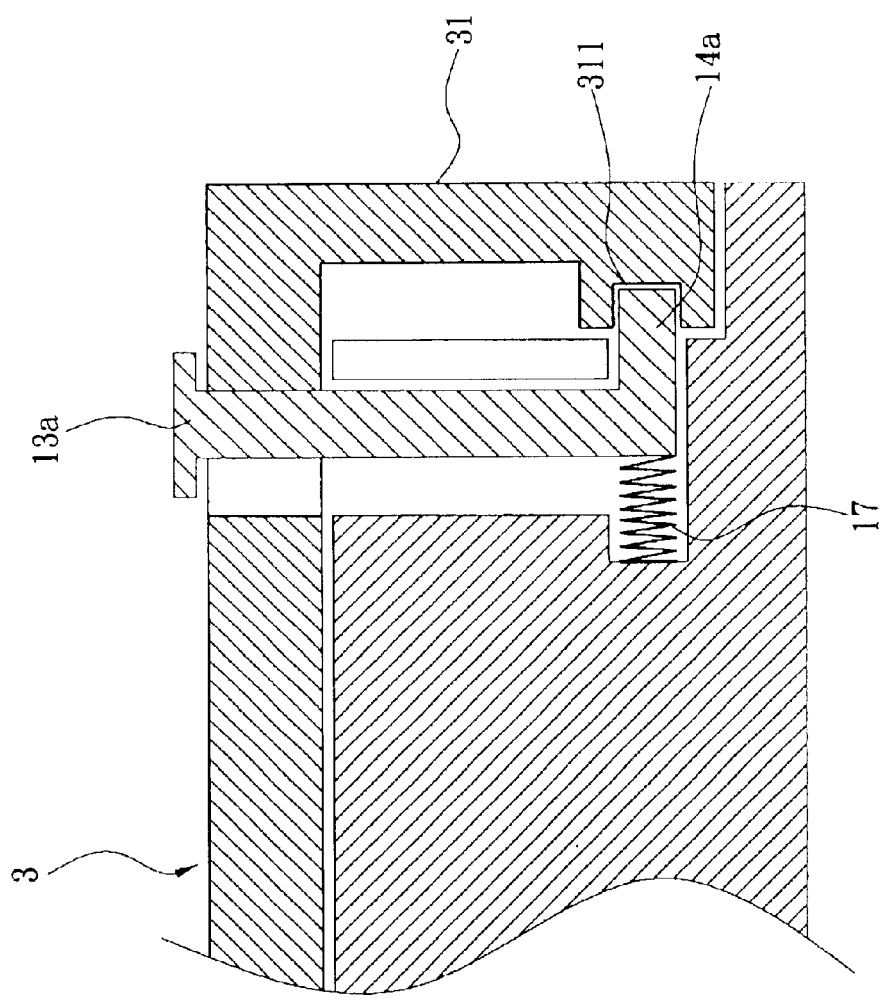

Finally, the front end of the keyboard module 3 may be lowered to make contact with a tabletop surface or other surfaces of working sites, as shown in FIG. 2E. Thus the top end of the keyboard module 3 is rested on the body 1. The thickness of the body 1 forms an elevation on the tabletop surface to allow the keyboard module 3 to form an angle to conform to ergonomics and to facilitate user operations.

For storing the keyboard module 3 again, push the trigger section 13b to unlatch the second tenon 14b, and move and slide the keyboard module 3 on the slide rails 12 until it is housed flat in the housing chamber 11. When in use, the housing chamber 11 is exposed, so the housing chamber may be equipped with other functions such as a hand writing tablet, heat radiator, mouse module, additional function keys, and the like. When the keyboard module 3 is moved to the operating location, the exposed housing chamber 11 may be used or function as designed.

Figure 4:
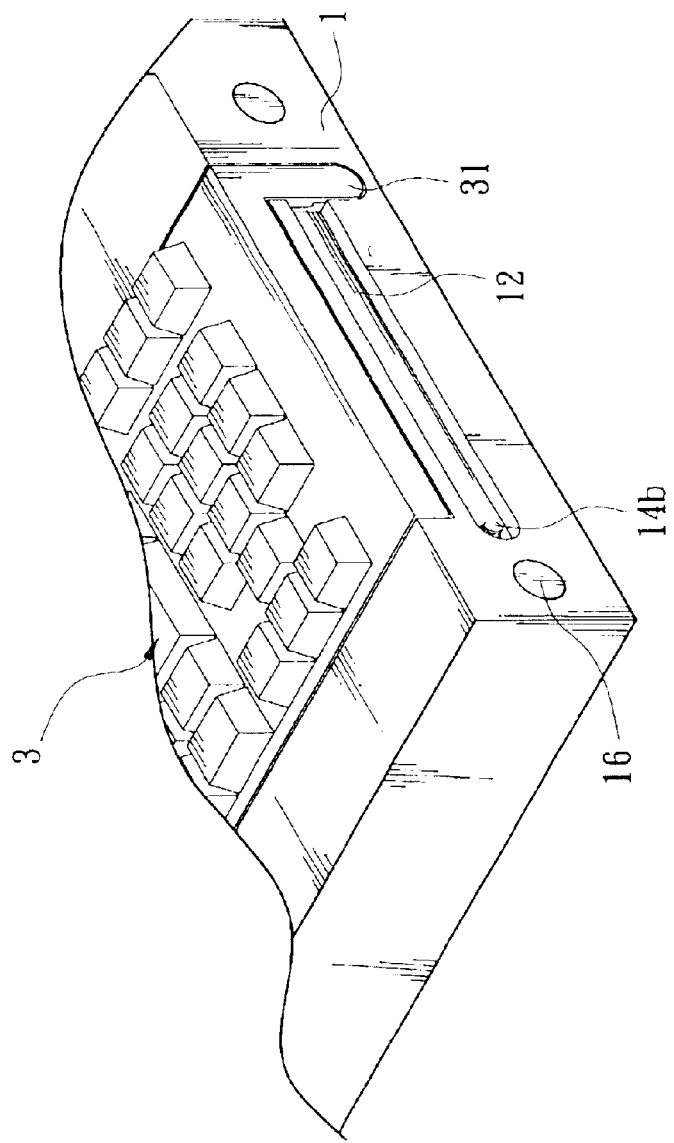
Figure 5:
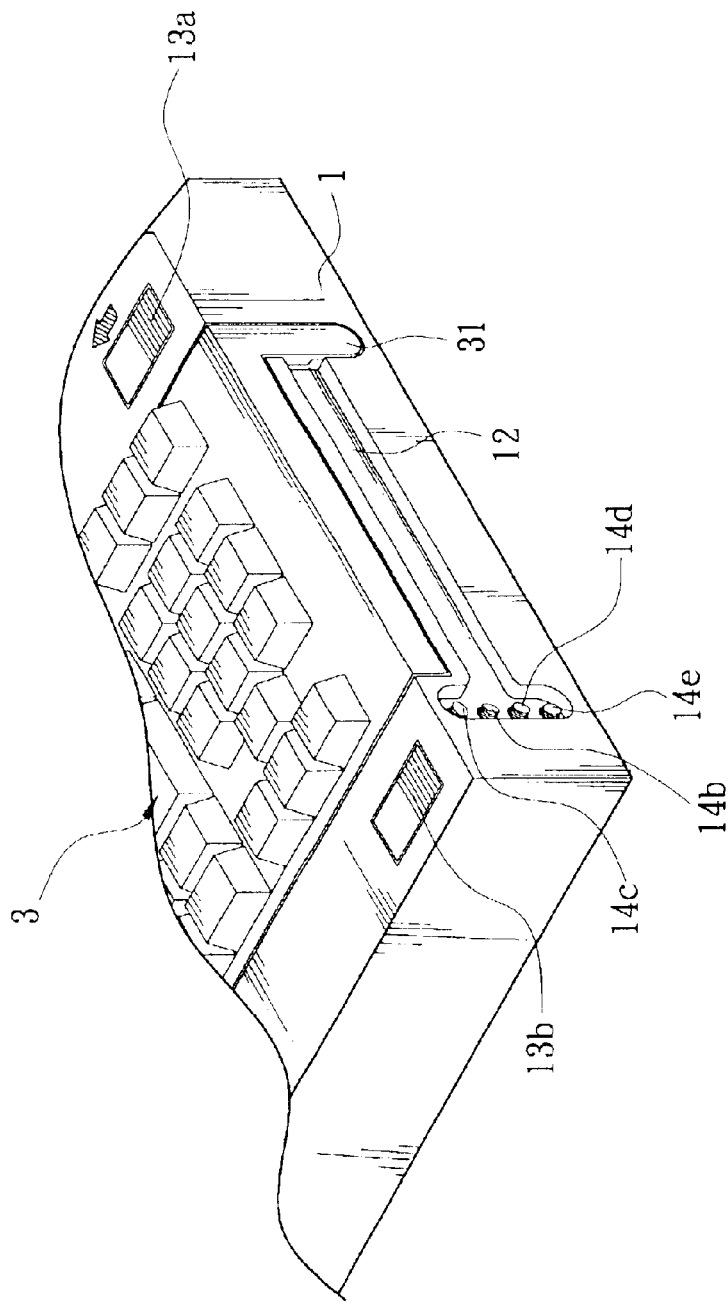

The tenons 14a and 14b may be designed in forms other than the trigger sections 13a and 13b. FIG. 4 shows another embodiment which is in the form of a pushbutton 16. Upon depressing the pushbutton 16, the tenons 14a, 14b are unlatched to achieve the same objective.

Operation angle of the keyboard module 3 can be controlled by the elevation of the second tenon 14b. In addition, the front end of the slide rails 12 of the body 1 may have a plurality of tenons 14b, 14c, 14d and 14e of different elevations so that users may freely choose one of them and raise the keyboard module 3 to a desired angle to obtain the most comfortable operating position.

In summary, the invention can achieve the following functions:

The notebook computer with a sliding keyboard according to the invention includes at least one slide rail extending from the pivotal side of the body to another side opposite to the pivotal side. The keyboard module is mounted on the slide rail in a straddle manner. In normal conditions, the keyboard is flatly housed in the housing chamber of the body. When in use, the keyboard may be slid along the slide rail until reaching the edge of the other side of the body opposite the pivotal side. Then the keyboard module may be rested on the edge of the body to form an angle to facilitate user operations. Such a construction conforms to ergonomics and allows users to operate the keyboard without hand pain.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A notebook computer with a sliding keyboard, comprising:
 a screen panel;
 a body pivotally engage with one side of the screen panel having a pair of slide rails located on two sides of said body extending from the pivotal side to another side opposite to pivotal side; and
 a keyboard module mounting on the slide rails of the body and forming an electric connection with the body, the keyboard module having two sides extending downwards to form a pair of hooks matching the slide rails and engageable therewith and slideable thereon, the slide rails having two tenons for anchoring the pair of hooks on two locations, the pair of hooks having a respective cavity for latching the tenons, the keyboard module being slidable along the slide rails for flatly lying on a surface of the body and slidable to an edge of the body to allow one end of the keyboard module resting on the edge of the body in an inclined manner to form an angle to facilitate user operations.

2. The notebook computer with a sliding keyboard of claim 1, wherein the tenons have respectively an exposed trigger section.

3. The notebook computer with a sliding keyboard of claim 1 further having a spring located on a rear side of the tenon to allow the tenon latching on the hook.

4. The notebook computer with a sliding keyboard of claim 1, wherein the slide rails on the edge of the body where the hooks of the keyboard module are slid and reached have a plurality of anchoring locations to allow the keyboard module forming different angles.

5. The notebook computer with a sliding keyboard of claim 1, wherein the body includes a housing chamber for holding the keyboard module.

6. The notebook computer with a sliding keyboard of claim 5, wherein the housing chamber has an expansion function module which is exposed for users to use when the keyboard module is slid to the edge of the body.

7. The notebook computer with a sliding keyboard of claim 6, wherein the expansion function module is selected from the group consisting of a hand written tablet, a heat radiator, a mouse module, additional function keys or combinations thereof.

* * * * *